US008187142B2

(12) United States Patent  (10) Patent No.: US 8,187,142 B2
Rohs et al.                 (45) Date of Patent:   May 29, 2012

(54) BEVEL FRICTION RING GEAR MECHANISM

(75) Inventors: Ulrich Rohs, Dueren (DE); Werner Brandwitte, Langerwehe (DE); Christoph Draeger, Inden (DE)

(73) Assignee: Ulrich Rohs, Dueren (DE)

( * ) Notice: Subject to any disclaimer, the term of this patent is extended or adjusted under 35 U.S.C. 154(b) by 550 days.

(21) Appl. No.: 12/311,199

(22) PCT Filed: Sep. 24, 2007

(86) PCT No.: PCT/DE2007/001725
§ 371 (c)(1),
(2), (4) Date: Aug. 12, 2009

(87) PCT Pub. No.: WO2008/034438
PCT Pub. Date: Mar. 27, 2008

(65) Prior Publication Data
US 2009/0305841 A1    Dec. 10, 2009

(30) Foreign Application Priority Data
Sep. 22, 2006 (DE) ........................ 10 2006 045 343
Jan. 11, 2007 (DE) ........................ 10 2007 002 581

(51) Int. Cl.
F16H 15/16    (2006.01)
(52) U.S. Cl. ................. 476/52; 476/51; 476/72; 476/73
(58) Field of Classification Search .............. 476/72, 476/73, 52, 51, 50
See application file for complete search history.

(56) References Cited

U.S. PATENT DOCUMENTS

| 3,481,213 | A  | * | 12/1969 | La Macchia | ................. 476/26 |
| 3,747,424 | A  | * | 7/1973  | Alexeev    | ................. 74/425.5 |
| 3,873,128 | A  |   | 3/1975  | Dunder et al. | |
| 6,139,465 | A  |   | 10/2000 | Holliday | |
| 6,468,180 | B1 | * | 10/2002 | Okubo et al. | ................. 476/40 |
| 6,666,792 | B2 | * | 12/2003 | Yoshikawa | ................. 476/73 |
| 6,752,740 | B2 | * | 6/2004  | Semmes | ................. 476/72 |
| 6,908,406 | B2 |   | 6/2005  | Overbay et al. | |
| 6,955,624 | B2 |   | 10/2005 | Brass | |
| 7,025,705 | B2 | * | 4/2006  | Kuehnle | ................. 475/331 |
| 2005/0160850 | A1 | | 7/2005 | Reisch | |

FOREIGN PATENT DOCUMENTS

| DE | 825 933    | 12/1951 |
| DE | 195 07 525 | 9/1996  |
| DE | 103 12 555 | 10/2004 |

(Continued)

OTHER PUBLICATIONS

International Search Report.

*Primary Examiner* — David M Fenstermacher
(74) *Attorney, Agent, or Firm* — Collard & Roe, P.C.

(57) ABSTRACT

In order to absorb loadings on friction faces in bevel friction ring gear mechanisms in an improved manner, the invention proposes a bevel friction ring gear mechanism having at least two friction cones which are arranged spaced apart from one another and a friction ring which is arranged displaceably in the spacing and transmits a torque from one of the two friction cones to the other of the two friction cones, wherein at least one friction face varies axially and the axial variation of the friction face has a radius above 0.1 mm in at least two convex regions.

20 Claims, 2 Drawing Sheets

FOREIGN PATENT DOCUMENTS

| | | |
|---|---|---|
| DE | 10 2004 003 721 | 8/2005 |
| EP | 1 167 819 | 1/2002 |
| EP | 1 235 002 | 8/2002 |
| FR | 1 375 048 | 10/1964 |
| FR | 1 386 314 | 1/1965 |
| WO | WO 2004/031615 | 4/2004 |

* cited by examiner

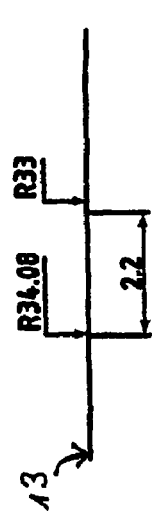
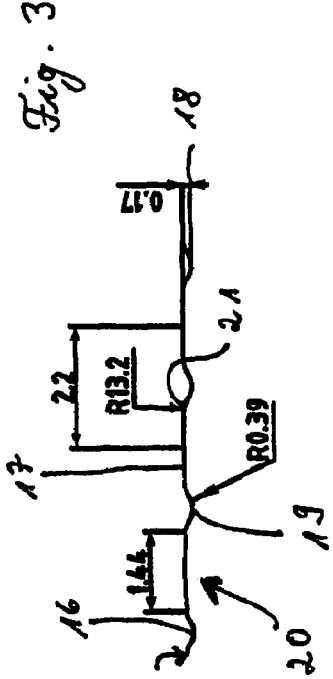
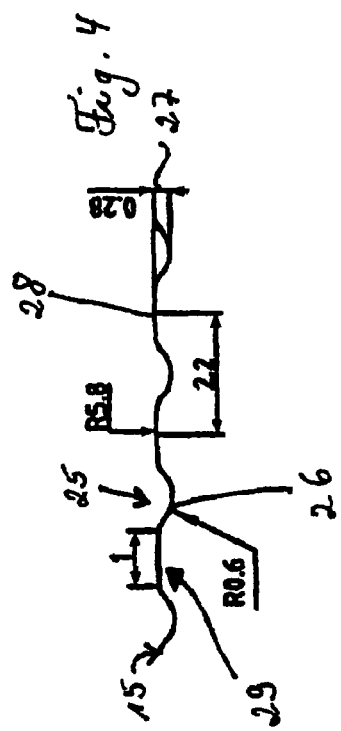
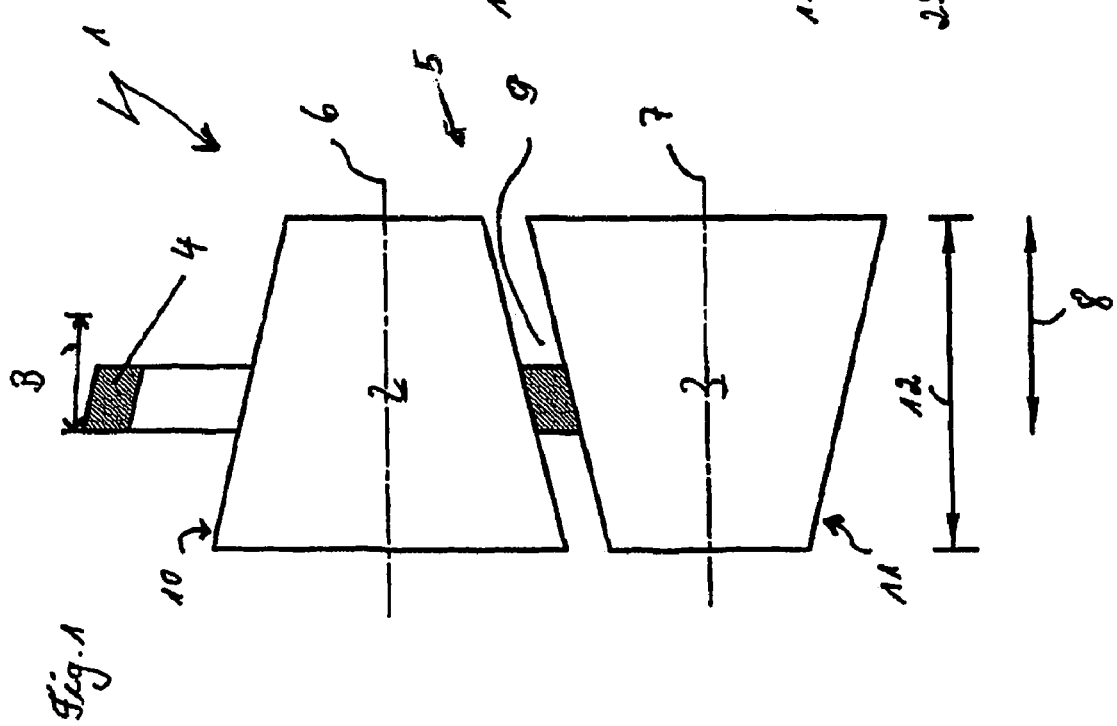

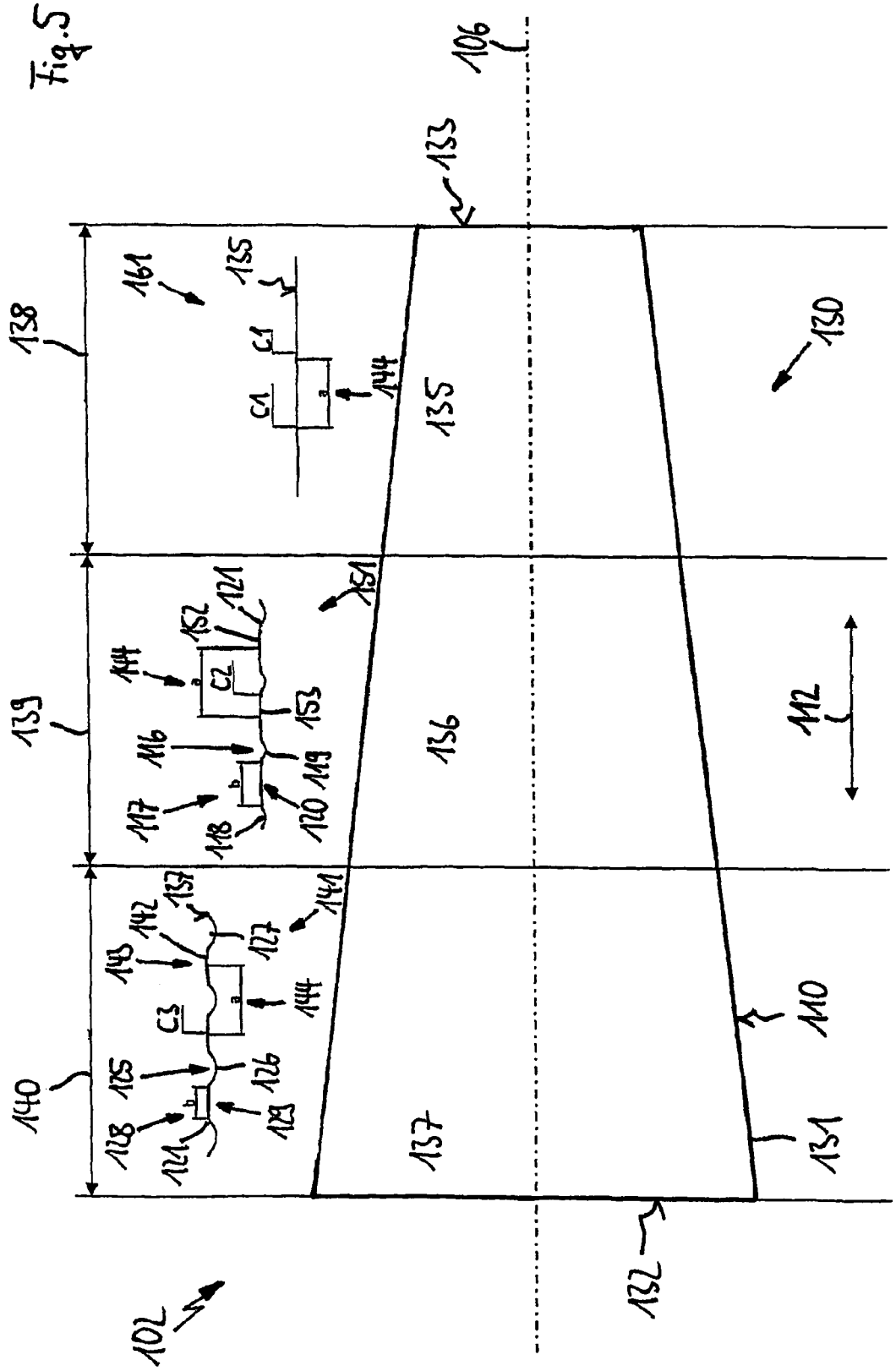

BEVEL FRICTION RING GEAR MECHANISM

CROSS REFERENCE TO RELATED APPLICATIONS

This application is the National Stage of PCT/DE2007/001725 filed on Sep. 24, 2007, which claims priority under 35 U.S.C. §119 of German Application No. 10 2006 045 343.3 filed on Sep. 22, 2006 and German Application No. 10 2007 002 581.7 filed on Jan. 11, 2007. The international application under PCT article 21(2) was not published in English.

The invention relates to bevel friction ring gear mechanisms having at least two friction cones which are arranged spaced apart from one another and having a friction ring which is arranged displaceably in said spacing along friction faces on the friction cones, and transmitting a torque from one of the two friction cones to the other of the two friction cones, at least one friction face varying axially.

Such bevel friction ring gear mechanisms are sufficiently known, for example, from WO 2004/031615 A2, the variation in the friction face being used to even out the surface pressure which is otherwise subjected to very large deviations, as a result of the running surface diameters which deviate considerably from one another, in particular relative to bevel friction ring gear mechanisms in which the friction ring encompasses at least one of the cones. Relative thereto, the grooves disclosed in this publication which may be incorporated in a surface in a very specific manner, have proved to be particularly advantageous.

In practice, however, it has been shown that surfaces designed in such a manner are subjected to considerable wear.

It is, therefore, the object of the present invention to develop further a generic bevel friction ring gear mechanism such that wear of the friction face is minimised.

The object of the invention is achieved by a bevel friction ring gear mechanism having at least two friction cones which are arranged spaced apart from one another and a friction ring which is arranged displaceably in said spacing along friction faces on the friction cones, and transmitting a torque from one of the two friction cones to the other of the two friction cones, in which at least one friction face varies axially and which is characterised in that the axial variation of the friction face has a radius above 0.1 mm in at least two convex regions.

Advantageously, the loading of the friction face is substantially reduced as a result of the radii selected in such a manner, so that the cones are subjected to substantially less wear.

In the present connection, the term "convex regions" describes surface regions of the friction face which in one section are of convex shape. Accordingly, according to the invention an axial variation is directed towards an axial section in which according to the invention the convex regions are to be formed. Accordingly, in connection with the present invention, the term "convex regions" describes, in particular, those regions of the friction face which form the groove lead-ins, in particular also groove lead-ins which are rounded within the meaning of the invention. Variations to the envelopes of the respective cone are not intended to be encompassed by the invention, such as for example variations to the friction face relative to the friction ring, as regards its gear ratio, such as for example deviations from an extremely conical outer periphery by altering the inclination of the surface line.

As, by means of the convex regions set forth above, a friction face is provided which allows a substantially frictional connection with a friction ring, the present invention does not encompass further continuously variable transmissions known from the prior art, in which a force and/or torque transmission does not take place as a result of a frictional connection between the cones and a ring connecting the cones, but positive connections which are produced between the cones and the ring are used for the force and/or torque transmission. Examples of bevel gear mechanisms, in which the force and/or torque transmission is achieved by means of positive connections, are sufficiently known from the prior art.

Thus in the German printed patent specification DE 825 933 B a continuously variable transmission is disclosed, in which a hard rubber ring circulates in a gap between two roughened and/or grooved cones. It is obvious that the hard rubber ring, which is clamped between the two cones, engages in the grooves of the cone, and as a result a positive connection is achieved by means of the hard rubber ring engaging in the individual grooves of the cone. Thus this invention differs fundamentally from the prior art, and in addition the problem of preventing a critical surface pressure between components of a bevel friction ring gear mechanism rubbing against one another is neither recognised nor disclosed.

The transmission system disclosed in the US printed patent specification U.S. Pat. No. 6,908,406 B2 behaves in a similar manner, in which an elastic ring is squashed between two cones provided with indentations such that the two cones which are indented on their surfaces are operatively connected by means of the squashed ring. However, a force and/or torque transmission between corresponding components does not take place due to frictional connections but substantially due to positive connections between the components. Thus the US printed patent specification U.S. Pat. No. 6,908,406 B2 also does not disclose a bevel friction ring gear mechanism in which a force and/or torque transmission takes place in a frictional manner between a friction ring and friction cones.

The continuously variable transmission from the published patent application DE 195 07 525 A1 is also used for a positive connection for the force and/or torque transmission between two bevel gears, in which a corresponding operative contact is achieved between the two bevel gears by means of an enclosed coil spring loop. In particular, in this case a force transmission with regard to bevel gears hitherto effected by frictional elements is now intended to be achieved by means of bevel gears and by means of coil spring loops engaging in the bevel gears. As the bevel gears of the continuously variable transmission disclosed there interact with their teeth positively with the coil spring loops, but the bevel friction ring gear mechanism according to the invention provides a frictional connection between the friction ring and the friction cones, the subject-matter disclosed in the published patent application DE 195 07 525 A1 also does not relate to the present bevel friction ring gear mechanism.

A further continuously variable bevel gear mechanism is known from the printed patent specification U.S. Pat. No. 6,139,465, in which by means of a ring clamped between two rotating cones, the two cones are positively connected to one another. In order to ensure and to reinforce said positive connection between the ring and the cones, the cones are additionally provided with gaps on their surfaces in the longitudinal extension. Also in this case there is no question of a bevel friction ring gear mechanism, as parts of the ring shown there engage in the surface of at least one of the cones provided with gaps.

A further continuously variable transmission with similarly designed cones is disclosed in the US printed patent specification U.S. Pat. No. 6,955,624 B2. However, in this case a peripheral belt is not clamped between two cones of the continuously variable transmission. Instead, the peripheral belt is tensioned by means of the two cones, by the belt encompassing the two cones. In order to be able to transmit forces and/or torques between the individual gear components, i.e. the belt and the cones, substantially without slip, the cone surfaces are provided with longitudinal grooves and the belt surface with transverse grooves, so that the peripheral belt is able to engage particularly easily in the grooved surfaces of the two cones, and as a result a secure positive connection is achieved.

Also with regard to the publications FR 1.375.048 and FR 1.386.314 continuously variable bevel gear mechanisms are disclosed, the friction faces thereof being grooved such that an elastic belt is squashed between two cones spaced apart from one another, and the belt thus squashed may engage particularly intimately in the grooves of the cone surface, so that a positive connection is made between the cones and the elastic belt without slip. With the exception of an exemplary rotational body shown in FIG. 10 of the last-mentioned French publication, all rotational bodies of continuously variable transmissions, shown in more detail there, are provided with longitudinal gaps, which extend in the longitudinal extension along the rotational axis of the rotational bodies. The rotational bodies shown in FIG. 10, however, comprise peripheral gaps and teeth, in which a toothed belt may engage, in order to achieve a good positive connection with the rotational bodies. A force and torque transmission between the belt and the rotational bodies configured cylindrically or conically as a result of a frictional connection, is naturally however excluded in this case.

For the above reasons, none of the cited continuously variable transmissions are bevel friction ring gear mechanisms within the meaning of the present invention in which a force and/or torque transmission is merely achieved by means of frictional connections. Due to the positive connections disclosed there, the gear mechanisms are not bevel friction ring gear mechanisms which are characterised in that between a friction ring and the friction cones in particular a frictional connection may be formed. In this connection, a fluidic frictional connection may be formed between the friction ring and the friction cones, in particular. In this connection, in particular in a standard operating state, a traction fluid and/or cooling fluid may be arranged between the friction ring and the friction cones, so that only in special operating conditions, for example in start-up situations or resting situations are the respective surfaces directly in contact.

In particular in a fluidic frictional connection by means of traction fluid and/or cooling fluid between the friction ring and the friction cones, the convex regions according to the invention are shown to their best advantage, as the fluid is partially displaced through the convex regions, whereby the surface pressure may be adapted in a suitable manner.

A further particularly preferred variant provides that the friction face has radial peripheral grooves for forming an axial variation. In structural terms, it is easy to vary in almost any manner a friction face in its axial longitudinal extension, in particular with such radial peripheral grooves on a friction cone.

Such axial surface variations may be achieved in a structurally simple manner if the friction face has radial peripheral grooves with differently configured groove depths and/or groove widths for forming an axial variation.

According to the design of the friction ring-friction cone-connection, the axial variation of the friction face may have a radius above 0.5 mm, preferably above 1 mm in the convex regions. As a result, with sufficient sharpness of the grooves, the loading on the groove lead-ins may be advantageously further reduced.

It is understood that combinations of different axial variants may also be implemented on one friction face of just one of the two cones.

The region of the friction face which is used for implementing a first gear range may have substantially smaller radii in its convex regions than is the case in regions of the friction face which form a middle gear range or the highest gear range.

In order to maintain an even more advantageous diffusion of stress within the cone material in regions of the friction face of concave configuration, and to be able to implement optimal transmission ratios in particular when using a traction fluid or cooling fluid, it is advantageous if the axial variation of the friction face has a radius above 0.01 mm, preferably above 0.05 mm in the concave regions. In this case, it is understood that such a design of concave regions in the friction face is correspondingly advantageous, irrespective of the remaining features of the present invention.

Concave regions on one friction face are formed, for example, by rounded groove bases.

Moreover, the object of the invention is also achieved by a bevel friction ring gear mechanism having at least two cones arranged spaced apart from one another, and a friction ring arranged displaceably in said spacing along friction faces on the friction cones, and transmitting a torque from one of the two cones to the other of the two cones, in which at least one friction face varies axially and which is characterised in that the axial variation of the friction face in at least two convex regions has a radius above a hundredth of the width B of the friction ring.

It has been shown that detailed consideration of the friction face with regard to convex and concave regions already brings considerable advantages relative to the friction faces of the prior art. It is particularly advantageous, however, if the radii of the convex and/or concave regions of the friction face are, moreover, adapted to the conditions of the friction ring used, in particular to the width of the friction ring used.

This is due to the fact, amongst others, that the loadings on the friction face may be caused by the friction ring, in particular even when a traction fluid and/or cooling fluid is used.

A related variant provides that the axial variation of the friction face in the convex regions has a radius above five hundredths, preferably above a tenth, of the width of the friction ring.

From the reasons already explained above, it is also advantageous if the axial variation of the friction face in concave regions has a radius above a thousandth, preferably above five hundredths, of the width of the friction ring, which accordingly is inventive irrespective of the remaining features of the present invention.

By means of radii which are not too small in concave regions, moreover, the uniformity of a torque transmission relative to variations in the consistency of the traction fluid or any other medium may be increased between the friction ring and the cone.

In addition to the dimensions of the radii of the convex and/or concave regions it is advantageous if the axial regions between two grooves are selected to be sufficiently solid, as said axial regions form the actual load-bearing region of the friction face. In this connection, at least in the axial regions with an average and/or large cone diameter, the grooves of less than a third of the width of the friction ring may be spaced apart from one another. By limiting the groove spacing, smoother running results in the event of load alteration. It is understood that the above explained groove spacings are also advantageous for generic bevel friction ring gear mechanisms, irrespective of the remaining features of the present invention.

At this point it might be noted that in the choice of ratios between the groove depths and groove widths, on the one hand, and a friction ring width, on the other hand, ideally care should be taken that with regard to a characteristic distribution of stress, with the Hertzian stress already described above, a first stress ellipse of a first convex region and a further stress ellipse of a further adjacent convex region separated therefrom by a groove, do not coincide in the groove base of the groove. Thus undesirable stress concentration in the region of a groove, in particular a groove base, may be prevented whereby the wear of a friction face may be further reduced.

However, a further object of the invention should be that the stress ellipses are selected to be as large as possible, so that stresses which occur are distributed over as large a surface as possible and thus may be introduced consistently into a friction cone material.

Moreover, it is advantageous if the friction face has radial peripheral raised portions for forming an axial variation. Also by means of such radial peripheral raised portions, a friction face may be easily axially varied in structural terms.

A particularly preferred variant in structural terms provides that radial peripheral raised portions of the friction face are formed by convex regions of the friction face. In particular, the convex regions in such a variant accordingly run radially around a friction face.

A particularly advantageous interaction between such peripheral convex regions and the peripheral grooves may result if one raised portion of the friction face forming a convex region is arranged between two grooves of the friction face. By such an interaction between the raised portions and the grooves, a friction face may be designed to be particularly extensively varied.

Advantageously, the grooves and raised portions on the friction face form a groove profile of the friction face which varies axially. On such a groove profile, a friction ring may roll in a frictional manner, in particular without wear and with suitably selected alterations to the surface pressure.

In this case, it is advantageous if the raised portions of the groove profile form wave crests of the friction face, said wave crests advantageously being able to be configured as convex regions with a radius above 0.1 mm.

A further particularly advantageous variant of the present invention provides that the friction ring in cooperation with a friction cone always covers at least two or more raised portions of one of the friction faces. If the friction ring covers at least two or more raised portions the risk is almost eliminated that the friction ring may tip inwards and/or run unevenly in a groove which is present. Advantageously, as a result, it may also be prevented that a convex region of the friction face is loaded in a particularly disadvantageous manner, which might result in increased wear of the friction face.

A particularly effective measure to ensure the smooth running between the friction ring and one of the friction faces with an increasing friction ring diameter, may be seen to be that when the groove width increases, the width of the wave crest is reduced.

Further advantages, objects and features of the present invention are explained with reference to the following description of the accompanying drawings, in which the construction of a bevel friction ring gear mechanism which is present, as well as surfaces which are designed differently by way of example, are shown schematically.

In which:

FIG. 1 shows schematically an arrangement consisting of a first cone, a second cone and a friction ring, FIG. 2 shows schematically the design of a friction face in a region for producing a low gear of a gear mechanism, FIG. 3 shows schematically the design of a friction face in a region for producing a middle gear range of a gear mechanism, FIG. 4 shows schematically the design of a friction face in a region for producing the highest gear range of a gear mechanism, and FIG. 5 shows schematically an input cone with three axial surface variants for a bevel friction ring gear mechanism.

The arrangement 1 shown in FIG. 1 shows the main components of a bevel friction ring gear mechanism, comprising a first cone 2, a second cone 3 and a friction ring 4 encompassing the first cone 2. The bevel friction ring 4 has in the present case a width B. Both cones 2 and 3 are spaced apart from one another by a spacing 5, the cone 2 rotating about a rotational axis 6 and the cone 3 about a rotational axis 7. In order to alter the gear ratio of the bevel friction ring gear mechanism, the friction ring 4 is axially displaced relative to the cones 2 and 3 along the rotational axes 6, 7 according to the double arrow 8 and thus also axially to the cones 2, 3. In this connection, the partial region 9 of the friction ring 4 directly in contact with the cones 2, 3, accordingly travels within the gap 5 according to the direction of movement 8.

In order to design the force transmission as advantageously as possible between the friction ring 4 and the cones 2, 3 as well as the loadings on a friction face 10 of the first cone 2 and on the friction surface 11 of the second cone 3, the friction faces 10, 11 vary along the axial longitudinal extension 12 of both cones 2, 3 so that as a result an axial variation of the friction faces 10, 11 results.

By way of example the aforementioned axial variation is described below with reference to FIGS. 2 to 4.

In this connection, the surface region 13 illustrated in FIG. 2 shows a friction face 10, 11 of the bevel friction ring gear mechanism of FIG. 1 in a first and/or very low gear range. The surface region 14 of FIG. 3 is a friction face 10, 11 in a middle gear range, whereas the surface region 15 according to FIG. 4 represents the highest gear range of a friction face 10, 11.

The surface region 13 substantially has grooves (in this case not visible for illustrative reasons) with a very shallow depth. The resulting wave crests in this case have a radius of R34.08 (the radius values R are understood to be in mm), and/or R33 and have a spacing of 2.2 mm relative to one another. The spacing is measured in this exemplary embodiment between a first vertex (in this case not specifically illustrated) of a first wave crest and a second vertex of a second wave crest.

In the surface region 14 grooves 16 are already more clearly defined. Wave crests 17 (in this case only numbered by way of example) are also 2.2 mm apart. In the surface region 14 the grooves 16 have a depth 18 of 0.17 mm and their rounded groove bases 19 have a radius R0.39. The wave crests 17 have a width 20 of approximately 1.4 mm, said wave crests comprising rounded groove lead-ins 21, which have a radius R13.2.

The surface region 15 comprises grooves 25 with rounded groove bases 26 with values R0.6 and a groove depth 27 of 0.28 mm. Between the individual grooves 25 extend wave crests 28 which are also arranged spaced apart from one another by 2.2 mm. The wave crests have in the present case a radius R5.8 and a width 29 of 1 mm which extend from a rounded groove lead-in to an adjacent rounded groove lead-in.

By means of the surface formed in such a manner, on the one hand the ring runs substantially more smoothly and may transmit a relatively high torque with admissible contact forces. Also the life of the friction face is substantially lengthened relative to known friction faces.

The friction cone 102 shown in FIG. 5 is an input friction cone 130 of a bevel friction ring gear mechanism, not shown here in more detail, which may rotate about a rotational axis 106 of a drive shaft of the bevel friction ring gear mechanism, not shown further here.

The input friction cone 130 is configured as a truncated cone 131 with a first edge region 132 and a second edge region 133. The input friction cone 130 is further provided with a friction face 110, which is varied along the axial longitudinal extension 112 of the input friction cone 130. To this end, the friction face 110 is roughly subdivided into three friction face variations 135, 136 and 137.

The first friction face variation 135 forms a first gear range 138, in which a friction ring (in this case not specifically shown, but see FIG. 1, reference numeral 4) is located, if the bevel friction ring gear mechanism is arranged, for example, in a start-up situation of a vehicle.

A middle gear range 139 with the second friction face variation 136 is adjacent to the first gear range 138 is, and a highest gear range 140 is adjacent thereto with the third friction face variation 137.

Proceeding from the highest gear range 140 and when considering the third friction face variation 137, with regard to a detailed view 141 of the third friction face variation 137, grooves 125 alternating with wave crests 128 are identified which, on the one hand, are arranged radially peripherally about the input friction cone 130 and, on the other hand, are arranged axially adjacent to one another along the axial longitudinal extension 112 of the input friction cone 130.

The wave crests 128 are formed by raised portions 142, which additionally form convex regions 143 on the input cone 130 with a radius C3. The wave crests 128 have in the region of the third friction face variation 137 a width (b) 129, which may be selected depending on the desired surface pressure between the friction ring and the friction face 110.

The friction ring mentioned here has a width (a) 144, which is selected so that the friction ring always remains in contact with two wave crests 128 and the friction ring in this case does not run the risk of tipping into one of the grooves 125, and as a result damaging the convex regions 143, in particular on the groove lead-ins 121.

By means of a groove depth 127, the groove volume may be varied in a structurally simple manner, whereby in turn the amount of traction fluid which is present between the friction ring and the input friction cone 130, may be varied.

A radius in the region of groove bases 126 is selected in this embodiment according to the ring width (a) 144, the radius in the region of the groove bases 126 approximately corresponding to a third of the friction ring width (a) 144.

If the second friction face variation 136 of the second gear range 139 of the input friction cone 130 is considered in a further detailed view 151, it may be seen clearly that the peripheral grooves 116 on the friction face 110 firstly have a shallower groove depth 118 and secondly have groove bases 119 with a smaller radius than the radii of the groove bases 126 on the third friction face variation 137.

The radius in the region of the groove bases 119 is in this embodiment a fifth of the friction ring width (a) 144.

The grooves 116 also alternate in the region of the second friction face variation 136 with corresponding peripheral wave crests 117 which are formed by further peripheral raised portions 152 on the input friction face 110. The wave crests 117 have in the region of the second friction face variation 136 a slightly greater width (b) 120 than the wave crests 128 of the third friction face variation 137. By means of the raised portions 152 and/or the wave crests 117 formed thereby, further convex regions 153 are provided on the friction face 110 of the input friction cone 130. These further convex regions 153 have a radius C2, which as explained further above, may be selected.

By means of the further convex regions 153 thus configured, rounded groove lead-ins 121 may be immediately provided, and with which the wave crests 117 may merge in a rounded manner with the disclosed groove bases 119.

With regard to the first friction face variation 135, the friction face 110 has in this case peripheral grooves which are no longer able to be shown meaningfully in terms of illustration, which is why these grooves are also not numbered (see third detailed view 161).

These peripheral grooves in the region of the first friction face variation 135 have only a very shallow depth, which is substantially less than the groove depths 118 and 127. Wave crests (in this case also not numbered) alternating with these grooves, in the region of the first friction face variation 135 have a radius C1.

The radii C1, C2, C3 of all wave crests 117, 128 of the friction face 110 are in the present case selected according to the force and/or torque ratios, the friction cone/friction ring-geometries used and the admissible surface pressure, which exist between the friction ring and the friction face 110.

The widths (b) of the wave crests may also be selected from the surface pressure and/or from the contact face to be provided between the friction ring and the friction face 110.

The ring width (a) 144 of the friction ring may be selected according to the desired use, the ring width (a) 144, however, should always cover at least two of the wave crests in order to prevent the risk of the friction ring tipping into one of the larger peripheral grooves 116, 125, in particular.

List of Reference Numerals

1 Arrangement
2 First friction cone
3 Second friction cone
4 Encompassing friction ring
5 Spacing
6 First rotational axis
7 Second rotational axis
8 Direction of movement
9 Partial region
10 First friction face
11 Second friction face
12 Axial longitudinal extension
13 First surface region
14 Second surface region
15 Third surface region
16 Grooves
17 Wave crests
18 Groove depth
19 Groove bases
20 Width
21 Groove lead-ins
25 Grooves
26 Groove bases
27 Groove depth
28 Wave crests
29 Width
102 First friction cone
106 Rotational axis
110 Friction face
112 Axial longitudinal extension
116 Grooves
117 Wave crests
118 Groove depth
119 Groove bases
120 Wave crest width
121 Groove lead-ins
125 Grooves
126 Groove bases 127 Groove depths
128 Wave crests
129 Wave crest widths
130 Input friction cone
131 Truncated cone
132 First edge region
133 Second edge region
135 First friction face variation
136 Second friction face variation
137 Third friction face variation
138 First gear range
139 Second gear range
140 Highest gear range
141 First detailed view
142 Raised portions
143 Convex regions
144 Friction ring width
151 Further detailed view
152 Further raised portions
153 Further convex regions
161 Third detailed view

The invention claimed is:

1. Bevel friction ring gear mechanism having at least two friction cones (2, 3; 102) which are arranged spaced apart from one another, and having a friction ring (4) which is arranged displaceably in said spacing (5) along friction faces (10, 11; 110) on the friction cones (2, 3; 102), and transmitting a torque from one of the two friction cones (2, 3; 102) to the other of the two friction cones (2, 3; 102), the friction ring (4) encompassing a first of the two cones (2) and at least one friction face varying axially, wherein the axial variation of the friction face (10, 11; 110) has a radius (C1, C2, C3) above 0.1 mm in at least two convex regions (143, 153) and a radius above 0.01 mm in at least two concave regions (19, 26; 119, 126), the friction ring (4) in cooperation with one of the friction cones (2, 3; 102) always covering at least two or more raised portions (142, 152) of one of the friction faces (10, 11; 110).

2. Bevel friction ring gear mechanism according to claim 1, wherein the axial variation of the friction face (10, 11; 110) has a radius (C1, C2, C3) above 0.5 mm, preferably above 1 mm in the two convex regions (143, 153).

3. Bevel friction ring gear mechanism according to claim 1, wherein the axial variation of the friction face (10, 11) has a radius above 0.05 mm in at least two concave regions (19, 26; 119, 126).

4. Bevel friction ring gear mechanism, having at least two friction cones (2, 3; 102) arranged spaced apart from one another, and a friction ring (4) displaceably arranged in said spacing (5) along friction faces (10, 11; 110) on the friction cones (2, 3; 102), and transmitting a torque from one of the two friction cones (2, 3; 102) to the other of the two friction cones (2, 3; 102), the friction ring (4) encompassing a first of the two cones (2) and at least one friction face (10, 11; 110) axially varying, wherein the axial variation of the friction face (10, 11; 110) in at least two convex regions (19, 26; 119, 126) has a radius (C1, C2, C3) which is more than a hundredth of the width (B; a, 144) of the friction ring (4) and in at least two concave regions (19, 26; 119, 126) has a radius above a thousandth of the width (B; a 144) of the friction ring (4), the friction ring (4) in cooperation with one of the friction cones (2, 3; 102) always covering at least two or more raised portions (142, 152) of one of the friction faces (10, 11; 110).

5. Bevel friction ring gear mechanism according to claim 1, wherein the axial variation of the friction face (10, 11; 110) in the convex regions (143, 153) has a radius (C1, C2, C3) which is more than five hundredths, preferably more than a tenth, of the width (B; a, 144) of the friction ring (4).

6. Bevel friction ring gear mechanism according to claim 1, wherein the axial variation of the friction face (10, 11; 110) in at least two concave regions (19, 26; 119, 126) has a radius above five hundredths of the width (B; a 144) of the friction ring (4).

7. Bevel friction ring gear mechanism according to claim 1, wherein the convex regions (143, 153) are arranged between two ends (132, 133) of a friction cone (2, 3; 102).

8. Bevel friction ring gear mechanism according to claim 1, wherein the convex regions (143, 153) are arranged in force and/or torque transmission regions of the friction cones (2, 3; 102).

9. Bevel friction ring gear mechanism according to claim 1, wherein the friction face (10, 11; 110) has radial peripheral grooves (16, 25; 116, 125) for forming an axial variation (135, 136, 137).

10. Bevel friction ring gear mechanism according to claim 1, wherein the friction face (10, 11; 110) has radial peripheral grooves (16, 25; 116, 125) with differently configured groove depths (18, 27; 118, 127) and/or groove widths for forming an axial variation (135, 136, 137).

11. Bevel friction ring gear mechanism according to claim 1, wherein at least in axial regions (14; 15; 138, 139, 140) with an average and/or large cone diameter, grooves (16; 25; 116, 125) of less than a third of the width (B, a, 144) of the friction ring (4) are spaced apart from one another.

12. Bevel friction ring gear mechanism according to claim 1, wherein a peripheral groove (16, 25; 116, 125) of a friction face (10, 11; 110) is defined by two convex regions (143, 153).

13. Bevel friction ring gear mechanism according to claim 1, wherein the friction face (10, 11; 110) has radial peripheral raised portions (142, 152) for forming an axial variation (135, 136, 137).

14. Bevel friction ring gear mechanism according to claim 1, wherein radial peripheral raised portions (142, 152) of the friction face (10, 11; 110) are formed by convex regions (143, 153) of the friction face (10, 11; 110).

15. Bevel friction ring gear mechanism according to claim 1, wherein one respective raised portion (142, 152) of the friction face (10, 11; 110) forming a convex region (143, 153) is arranged between two grooves (16, 25; 116, 125) of the friction face (10, 11; 110).

16. Bevel friction ring gear mechanism according to claim 1, wherein grooves (16, 25; 116, 125) and raised portions (142, 152) on the friction face (10, 11; 110) form a groove profile of the friction face (10, 11; 110) which varies axially.

17. Bevel friction ring gear mechanism according to claim 15, wherein the raised portions (142, 152) of the groove profile form wave crests (17, 28; 117, 128) of the friction face (10, 11; 110).

18. Bevel friction ring gear mechanism according to claim 1, wherein when the groove width increases, the width (120, 129) of the wave crests (17, 28; 117, 128) is reduced.

19. Bevel friction ring gear mechanism according to claim 1, wherein between the friction ring (4) and the friction cones (2, 3; 102) a frictional connection is substantially present, preferably exclusively a fluidic frictional connection.

20. Bevel friction ring gear mechanism according to claim 1, wherein in one operating state a traction fluid and/or a cooling fluid is arranged between the friction ring (4) and the friction cones (2, 3; 102).

* * * * *